(12) United States Patent
Purves et al.

(10) Patent No.: US 10,996,371 B2
(45) Date of Patent: May 4, 2021

(54) ADAPTIVE HORIZON TRACKING (71) Applicant: Foster Findlay Associates Limited, Newcastle upon Tyne (GB)

(72) Inventors: Stephen Purves, Islas Canarias (ES); James Lowell, Medomsley (GB); Dale Norton, Oldham (GB); Jonathan Henderson, Morpeth (GB)

(73) Assignee: Foster Findlay Associates Limited, Newcastle upon Tyne (GB)

( * ) Notice: Subject to any disclaimer, the term of this patent is extended or adjusted under 35 U.S.C. 154(b) by 891 days.

(21) Appl. No.: 14/409,732

(22) PCT Filed: Apr. 11, 2013

(86) PCT No.: PCT/GB2013/050941
§ 371 (c)(1),
(2) Date: Dec. 19, 2014

(87) PCT Pub. No.: WO2014/001751
PCT Pub. Date: Jan. 3, 2014

(65) Prior Publication Data
US 2015/0316683 A1 Nov. 5, 2015

(30) Foreign Application Priority Data
Jun. 29, 2012 (GB) .................................. 1211603

(51) Int. Cl.
*G01V 99/00* (2009.01)
*G06F 17/18* (2006.01)
(Continued)

(52) U.S. Cl.
CPC .............. *G01V 99/005* (2013.01); *G01V 1/30* (2013.01); *G06F 17/18* (2013.01); *G01V 2210/641* (2013.01); *G01V 2210/643* (2013.01)

(58) Field of Classification Search
CPC ................... G06V 2210/641; G06V 2210/643
See application file for complete search history.

(56) References Cited

U.S. PATENT DOCUMENTS 5,056,066 A   10/1991 Howard
5,153,858 A   10/1992 Hildebrand
(Continued)

FOREIGN PATENT DOCUMENTS

WO   WO-200203099 A2    1/2002
WO   WO-2007046107 A2   4/2007

OTHER PUBLICATIONS

J Henderson, James Lowell, Steve Purves, Gaynor Fisher, and David Walraven (2009) Interpreter Driven, Interactive 3D Multi-Attribute Classification. 11th International Congress of the Brazilian Geophysical Society & EXPOGEF 2009, Salvador, Bahia, Brazil, Aug. 24-28, 2009: pp. 875-878.*

(Continued)

*Primary Examiner* — Omar F Fernandez Rivas
*Assistant Examiner* — Robert S Brock
(74) *Attorney, Agent, or Firm* — Praedcere Law (57) ABSTRACT

A computer executable algorithm adapted to propagate a boundary surface of a seed that is placed within a region of interest of a visual representation of a 3D seismic data so as to follow a natural contour of said region of interest, wherein said algorithm is executable to: (i) generate at least one attribute volume comprising at least on attribute derivable from said 3D seismic data set; (ii) generate at least one characteristic parameter for a plurality of candidate events of said 3D seismic data within a predefined gate region located forward of said propagating boundary surface; (iii) generate and assign a probability characteristic for said plurality of candidate events based on said at least one attribute volume and said at least one characteristic parameter; and propagate said boundary surface towards and incorporating any one of (Continued)

said plurality of candidate events that fulfils an acceptance criteria of said probability characteristic so as to generate a surface along the natural contour of said region of interest.

6 Claims, 9 Drawing Sheets

(51) Int. Cl.
*G01V 1/30* (2006.01)
*G01V 1/28* (2006.01)

(56) References Cited

U.S. PATENT DOCUMENTS

| | | | | |
|---|---|---|---|---|
| 7,844,402 | B2* | 11/2010 | Klein | G01V 1/288 702/14 |
| 8,566,069 | B2* | 10/2013 | Pauget | G01V 1/30 703/6 |
| 2004/0062145 | A1 | 4/2004 | Dunn et al. | |
| 2004/0260476 | A1 | 12/2004 | Borgos et al. | |
| 2005/0171700 | A1* | 8/2005 | Dean | G01V 1/301 702/16 |
| 2010/0149917 | A1* | 6/2010 | Imhof | G01V 1/345 367/53 |
| 2010/0171740 | A1* | 7/2010 | Andersen | G01V 99/00 345/424 |
| 2010/0214870 | A1* | 8/2010 | Pepper | G01V 1/30 367/72 |
| 2011/0054857 | A1* | 3/2011 | Moguchaya | G01V 99/00 703/2 |
| 2011/0115787 | A1* | 5/2011 | Kadlec | G01V 1/345 345/419 |
| 2011/0307178 | A1 | 12/2011 | Hoekstra | |
| 2013/0030710 | A1* | 1/2013 | Lomask | G01V 1/30 702/17 |
| 2015/0234067 | A1* | 8/2015 | Purves | G01V 1/30 702/14 |

OTHER PUBLICATIONS

Henderson, Jonathan, Stephen J. Purves, and Chris Leppard. "Automated delineation of geological elements from 3D seismic data through analysis of multichannel, volumetric spectral decomposition data." First Break 25, No. 3 (2007). pp. 87-93.*

Jones T.N., Metaxas D.N. (1997) Automated 3D segmentation using deformable models and fuzzy affinity. In: Duncan J., Gindi G. (eds) Information Processing in Medical Imaging. IPMI 1997. Lecture Notes in Computer Science, vol. 1230. Springer, Berlin, Heidelberg, pp. 113-126.*

McArdle, N. J., T. Kristensen, J. Lowell, H. Basford, D. Norton, and S. J. Purves. "Spits, channels and beaches: Advanced imaging and delineation of Jurassic and Triassic stratigraphic targets." In PETEX 2010 Technical Conference. London. 2010. 8 pages.*

Purves, Steve, and Helen Basford. "Visualizing geological structure with subtractive color blending." GCSSEPM Extended Abstracts (Dec. 7, 2011). pp. 120-139.*

Paton, Gaynor, Ahmed Elghorori, and Nick McArdle. "Adaptive Geobodies: Extraction of Complex Geobodies from Multi-attribute Data Using a New Adaptive Technique." in GEO 2012. Mar. 2012. 1 page (Year: 2012).*

Pichumani, Ramani. "Snakes: An active model." Advantages and disadvantages (1997). obtained from http://homepages.inf.ed.ac.uk/rbf/CVonline/LOCAL_COPIES/RAMANI1/node31.html on Mar. 23, 2018. 3 pages (Year: 1997).*

Kass, Michael, Andrew Witkin, and Demetri Terzopoulos. "Snakes: Active contour models." International journal of computer vision 1, No. 4 (1988): 321-331. (Year: 1988).*

Admasu, Fitsum, and Klaus Toennies. "Exploiting 3D spatial continuity for robust automatic horizon matching across faults." In Third International Symposium on 3D Data Processing, Visualization, and Transmission (3DPVT'06), pp. 695-702. IEEE, 2006 (Year: 2006).*

Ahuja, Neelu Jyothi, and Parag Diwan. "An expert system for Seismic data interpretation using visual and analytical tools." International Journal of Scientific & Engineering Research 3, No. 4 (2012): 1-13 (Year: 2012).*

Borgos, Hilde G., Thorleif Skov, and Lars Sønneland. "Automated structural interpretation through classification of seismic horizons." In Mathematical Methods and Modelling in Hydrocarbon Exploration and Production, pp. 89-106. Springer, Berlin, Heidelberg, 2005 (Year: 2005).*

Henderson, Jonathan, Gaynor Paton, Barbara Froner, James Lowell, and M. Ackers. "Integrating interpretation expertise and objective data analysis in 3D interpretation." The Leading Edge 31, No. 11 (2012): 1374-1381 (Year: 2012).*

Hoyes, Jack, and Thibaut Cheret. 'A review of "global" interpretation methods for automated 3D horizon picking.' The Leading Edge 30, No. 1 (2011): 38-47 (Year: 2011).*

Authors Unknown, MIPAV User Guide—Chapter 9, National Institutes of Health, pp. 307-353 2008 (Year: 2008).*

Authors Unknown, MIPAV change list 4.x.x, obtained from https://mipav.cit.nih.gov/pubwiki/index.php/MIPAV_change_list_4.x.x on Mar. 19, 2019, 18 pages (Year: 2019).*

G. Zinck, M. Donias, S. Guillon and O. Lavialle, "Discontinuous seismic horizon tracking based on a poisson equation with incremental dirichlet boundary conditions," 2011 18th IEEE International Conference on Image Processing, Brussels, 2011, pp. 3385-3388 (Year: 2011).*

Scappazzoni, E., "International Search Report," prepared for PCT/GB2013/050941, as dated Feb. 24, 2014, four pages.

McCardle, Nicholas, et al., "Advanced Multiattribute Imaging and Geobody Delineation of Jurassic and Triassic Stratigraphic Targets," GCSSEPM 2011, http://www.ffa-geosciences.com/download/GCSSEPM_2011_Multiattribute.pdf, Dec. 1, 2011, pp. 230-250.

Paton, Gaynor, et al., "Adaptive Geobodies: Delineation of Complex and Heterogeneous Stratigraphic Features," Annual International SEG Meeting, Jan. 1, 2011, pp. 4384-4387.

Henderson, Jonathan, "Geological Expression: Data Driven-Interpreter Guided Approach to Seismic Interpretation," *First Break*, vol. 30, Mar. 2012, pp. 73-78.

Paragios, Nikos, et al., "Geodesic Active Regions: A New Framework to Deal With Frame Partition Problems in Computer Vision," *Journal of Visual Communication and Image Representation*, vol. 13, No. 1-2, Mar. 30, 2002, pp. 249-267.

EPO Examination Report dated Aug. 26, 2019, 9 pages.

Shin-yee Lu et al, "An iterative approach to seismic skeletonization", Geophysics, vol. 55, No. 10, Oct. 1990, pp. 1312-1320.

* cited by examiner

Figure 14

ADAPTIVE HORIZON TRACKING

The present invention relates generally to the field of oil and gas exploration, and in particular to the field of computer aided exploration for hydrocarbons using geophysical data, such as for example seismic data, of the Earth. In particular, the present invention relates to a computerized method and computer system for adaptively determining and visualizing (modelling) geological objects, such as horizons, in a volume of representative geophysical survey data.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of stages (i), (ii) and (iii). For example, a seismic source is used to generate an acoustic signal that propagates into the Earth and that is at least partially reflected by subsurface seismic reflectors, also known as horizons. The reflected signals are then detected and recorded by an array of seismic receivers located at or near the surface of the Earth, in an overlying body of water, or at known depths of boreholes.

Figure 1:
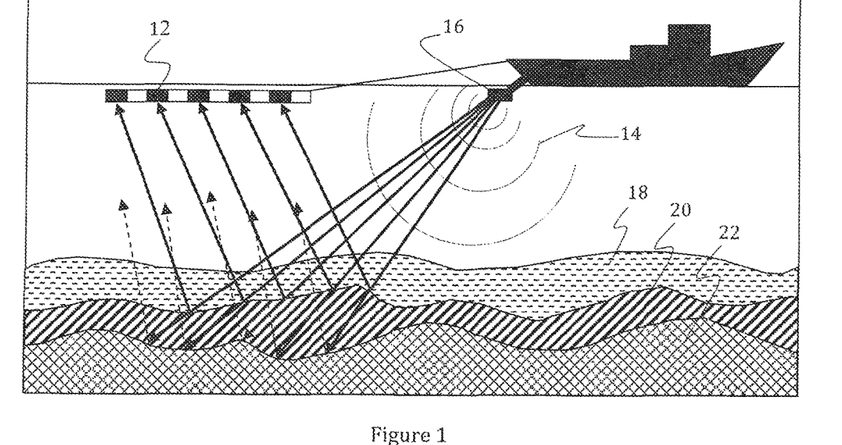
FIG. 1 shows a typical setup for an offshore seismic survey using an array of acoustic receivers (i.e. hydrophones) and sound waves generated by an air gun.

FIG. 1 shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 which travel down through the seabed and reflect back from the different layers of rock 18, 20, 22 in the subsurface horizons). The reflected sound waves 14 are then received by the hydrophones (not shown) located along the seismic streamers which when processed can be used to provide a visual representation (2D, 3D) of the substrata.

Figure 2:
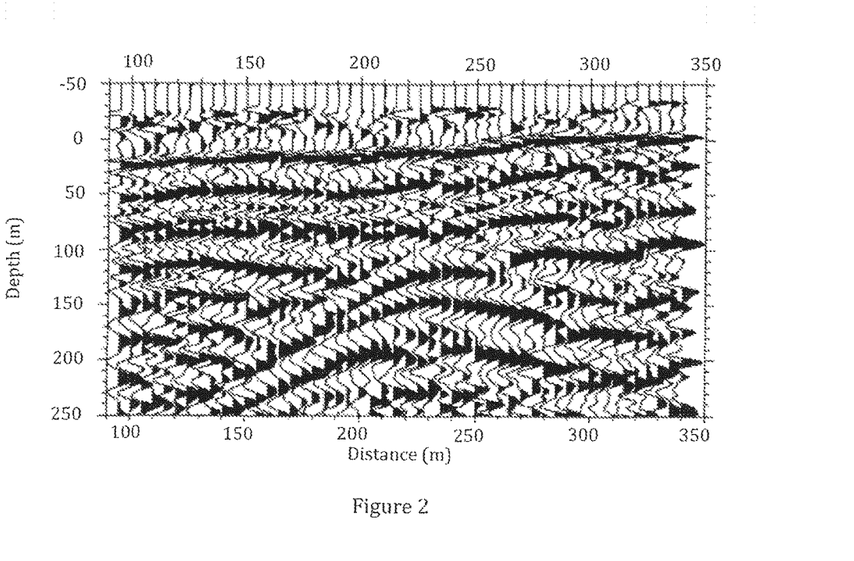
FIG. 2 shows a typical plot of migrated reflection traces recorded by the acoustic receivers after activating the air gun.

Typical seismic traces of the reflections (amplitudes) are shown in FIG. 2. The data shown in FIG. 2 has been migrated, i.e. the amplitudes of the traces are moved to their true subsurface position (depth) to eliminate any offset.

Figure 3:
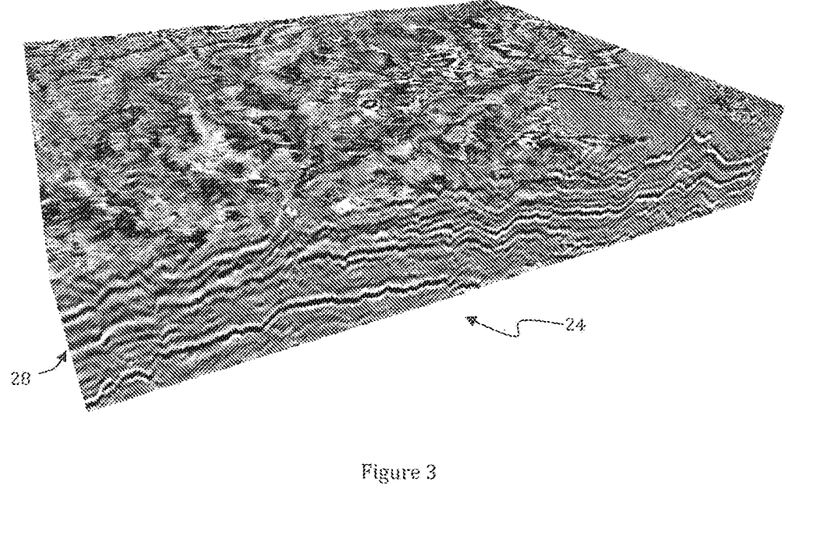
FIG. 3 shows a 3D volume of the migrated reflection data recorded by the acoustic receivers.
Figure 4:
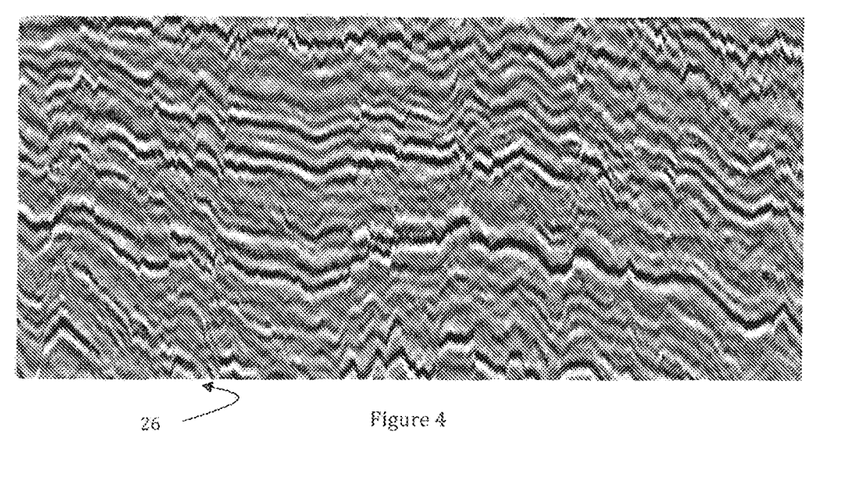
FIG. 4 shows a 2D slice of the 3D volume shown in FIG. 3 clearly showing different horizon layers.

FIGS. 3 and 4 show an example of a 3D seismic data volume 24 and a respective 2D slice 26 of the 3D seismic volume 24 based on the migrated reflectivity data. The representation clearly shows different horizons 28 and allows the identification of faults. In the field of geology, a horizon is defined as an interface surface separating two strata having different properties or of different composition.

In reflection seismology, a horizon may also have a broader meaning relating to any change in acoustic properties which can be mapped as a geological surface or a natural contour underlying the data. As such, a given interpreted horizon may be expressed within the data in different ways depending on the geological nature of the surface (i.e. the rock and fluid properties at the interface of two strata, presence of an unconformity surface) and on imaging and data processing parameters (i.e. phase correction applied to the data).

The result is that a horizon may be tracked on any natural contour that is apparent and differentiable within the seismic data, not only the amplitude peaks or troughs evident in FIG. 2.

In the field of geology, faults 30 are surfaces within the Earth's crust at which sedimentary reflective layers (e.g. strata and horizons) and other geological features are disrupted. In particular, faults 30, which often continue through multiple horizon layers 28, can form effective barriers to subsurface hydrocarbon flow, causing oil and gas to accumulate at such horizon 28/fault 30 intersections.

Accordingly, the precise detection and characterization of individual horizon layers 28 and the faults 30 disrupting such horizons 28 is a very important tool in the search for oil and gas reserves, and the accuracy and completeness with which these so called geological objects (e.g. horizon, fault) can be detected and characterized may have a significant impact on identifying and exploiting those reserves.

However, the interpretation of the vast geological data accumulated in, for example, 3D seismic data surveys, is a very time-consuming task that currently requires advanced interpretation workstations and trained experienced personnel, such as an experienced geophysicist (i.e. a seismic interpreter). Therefore, it is today's common practice to use automated techniques, semi-automated and fully automated horizon tracker software systems in order to process the amount of data produced by modern geological surveys.

However, the known automated techniques and available horizon trackers typically generate the tracked horizon along orthogonal grid axes and are relatively limited when trying to accurately follow the topological changes of the true reflective horizon, or when combining a tracked reflective surface that started from multiple seeds planted within the region of interest.

In particular, conventional horizon trackers commonly fail to follow a desired seismic event (i.e. reflective surface, horizon) due to poor quality data, causing discontinuities within the data (non-continuous data), event dimming or chaotic faulted areas. Such poor quality data can cause these horizon trackers to jump between different reflective horizons and subsequently follow a wrong event.

Typical causes for such discontinuities within the data representing a reflective horizon may be: (i) physical breaks in the reflective horizon; (ii) changes in rock type or geometry, causing fluctuations in material properties (e.g. density, elastic moduli) and changes in impedance, which may further result in brightening or dimming of the visual representation of the data; (iii) variation in layering and layer thicknesses at and around seismic resolution causing tuning effects and the horizon becoming unresolved (iv) signal attenuation caused by adjacent reflective layers or faults; (v) localized high or low velocity zones, causing "pull-ups"/"sags" in the reflective horizon; (vi) interference with neighbouring layers at converging/diverging zones; (vii) acquisition noise, usually a coherent noise with a very linear footprint that is aligned with the survey grid (snail lines), and (viii) processing noise, such as hyperbolic noise, which is coherent and an artefact of migration.

In addition, many conventional horizon trackers fail to automatically "cross" barriers, such as physical breaks in the horizon caused by faulting or fracturing, so that additional seeds have to be placed manually by the operator, in order to generate a computer model of correlating reflective surfaces (i.e. horizon) throughout the entire 3D seismic data volume.

Accordingly, it is an object of the present invention to provide a method and system as well as an improved workflow for adaptive horizon tracking. In particular, it is an object of the present invention to provide improved computer executable algorithms adapted to generate and evolve a more accurate computer model of the natural contour of a reflective surface (i.e. horizon) from at least one seed point irrespective of disruptions caused by faults or discontinuities caused by "poor" data.

SUMMARY OF THE INVENTION

Preferred embodiments of the invention seek to overcome one or more of the above disadvantages of the prior art.

According to a first aspect of the present invention, there is provided a computer executable algorithm adapted to propagate a boundary surface of a seed that is placed within a region of interest of a visual representation of a 3D seismic data so as to follow a natural contour of said region of interest, wherein said algorithm is executable to:
  generate at least one attribute volume comprising at least one attribute derivable from said 3D seismic data set;
  generate at least one characteristic parameter for a plurality of candidate events of said 3D seismic data within a predefined gate region located forward of said propagating boundary surface;
  generate and assign a probability characteristic for said plurality of candidate events based on said at least one attribute volume and said at least one characteristic parameter; and
  propagate said boundary surface towards and incorporating any one of said plurality of candidate events that fulfils an acceptance criteria of said probability characteristic so as to generate a surface along the natural contour of said region of interest.

This provides the advantage that the horizon tracker can compensate for complex profiles and/or poor quality data by providing an improved trackability of such reflective surfaces and allowing the generated model to more closely follow the lateral continuity of the reflective surface to be tracked. In particular, by using, for example, a 2D adaptive surface as propagating front through the 3D space, the generated surface model is not confined to travel along orthogonal grid axes and the natural direction of the event can therefore be tracked. Also the use of probability characteristics for candidate events allows for smaller steps of propagation movement during the generation of the surface model sub-sampling and tracking the reflective surface of interest through the 3D seismic data volume more accurately.

Improved flexibility and adaptability is provided by allowing to track the natural contour of the reflective surface either on a single 3D seismic volume, or multiple 3D seismic data volumes simultaneously, as well as, allowing the use of a wider range of attribute responses.

Typically, the plurality of events may be waveforms within said region of interest of said 3D seismic data. Preferably, the characteristic parameter may be a degree of similarity between said plurality of events, wherein the probability characteristic may be based on an optimization function. Preferably, the optimization function may be a cost function adapted to determine a cost value for each one of said plurality of candidate events within said predefined gate region.

This provides the advantage of creating a statistical model within the gate region for each of the candidate events linking the reflective surface position to the 3D seismic data.

Typically, the region of interest may be a substantially horizontal stratigraphic layer of differentiatable seismic characteristics.

Advantageously, the predefined gate region may be defined by constraints provided within said 3D seismic data volume. Preferably, the predefined gate region may include events belonging to different vertical locations within said 3D seismic data volume relative to said region of interest.

This provides the advantage that limited movement is permitted in a vertical direction with respect to the principal orientation of the tracked reflective surface, therefore, providing an additional degree of freedom and subsequently more flexibility to accurately follow the natural contour of the tracked reflective surface.

The boundary surface may be propagated in accordance with an active contour method and/or level set method.

Figure 5:
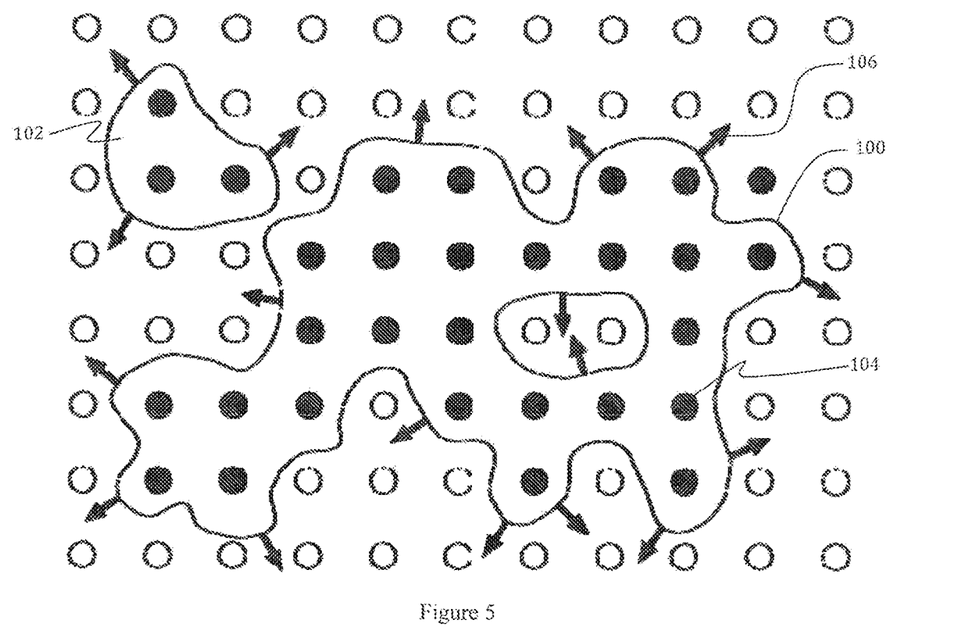
FIG. 5 shows an illustration of a propagating front of the horizon as two 2D surfaces which are close to merging, candidate events that have been selected are shown in black.

Therefore, the boundary surface may advantageously be propagated in accordance with an adaptive surface method that effectively handles a propagating front which may be manifold, disjoint and subject to topological change. In addition, all of the surface propagating fronts, as shown for example in FIG. 5, are therefore all part of the same "hyper-front", i.e. it is possible to have as many disjoint fronts and apparent holes as possible without causing a disproportionate increase in computational cost.

Preferably, the predefined gate region is selectively adjustable. This provides the advantage that the operator/interpreter can adapt the gate region in accordance with specific requirements of a particular region of the tracked reflective surface.

According to a second aspect of the present invention, there is provided a computer executable algorithm adapted to propagate a boundary surface of a seed that is placed within a first region of interest of a visual representation of a 3D seismic data so as to follow a probable contour of a discontinuous data representation of at least part of said first region of interest, wherein said algorithm is executable to:
  generate at least one characteristic parameter for a plurality of candidate events of said 3D seismic data within a predefined gate region located forward of said propagating boundary surface;
  generate and assign a probability characteristic for said plurality of candidate events based on said at least one characteristic parameter;
  determine a plurality of events of at least part of at least a second region of interest located substantially parallel to and conformant with at least part of said first region of interest; and
  propagate said boundary surface through said non-continuous data representation utilizing a link between said propagating boundary surface and said plurality of events of at least part of said at least one second region of interest.

Advantageously, the computer executable algorithm is further executable to generate at least one attribute volume comprising at least one attribute derivable from said 3D seismic data.

Preferably, the link may be provided by at least one constraint defined in accordance with said probability characteristics assigned to each one of said plurality of candidate events of at least part of said first region of interest. Advantageously, the at least one constraint may be adapted to provide an internal force between respective events of at least part of said first region of interest and at least part of said at least one second region of interest. Preferably, the internal force between respective events may be inversely proportional to said probability characteristics of each one of said plurality of events of at least part of said first region of interest.

This provides the advantage that regions of poor quality data can be "crossed" using a conformant guide reflector (i.e. a parallel reflective surface) to steer the propagating boundary surface along a most likely contour of the tracked reflective surface. In particular, the "weak" events are linked to the guide reflector using constraints that are dependent on the actual "weakness" of each event, i.e. the weaker the event, the stronger the link to the guide reflector and vice versa. This ensures that the most likely model of the reflector surface of the region of interest (horizon) is generated through the entire 3D seismic volume.

The computer executable algorithm may further be executable to generate at least one attribute volume comprising at least on attribute derivable from said 3D seismic data This provides the advantage of an improved selectability of candidate events allowing the computer model to more closely follow the natural contour of the tracked reflective surface.

Advantageously, the constraint may include a selectively adjustable weighing factor.

This provides the advantage that the operator can manually adjust the boundary conditions of the guide reflector in order to selectively steer the computer model along the most likely contour of the tracked reflective surface.

According to a third aspect of the present invention, there is provided a computer executable algorithm adapted to propagate a boundary surface of a seed that is placed within a first region of interest of a visual representation of a 3D seismic data so as to follow a natural contour of a data representation of at least part of said first region of interest, wherein said algorithm is executable to:

generate and assign a probability characteristic for a plurality of candidate events within a predefined gate region located forward of said propagating boundary surface;

generate an optimization function based on said probability characteristic of each one of said plurality of candidate events;

deform and propagate said boundary surface in accordance with said optimization function.

Advantageously, the optimization function may be a cost function field adapted to provide an external force function within said predefined gate region. Even more advantageously, the predefined gate region may be a predefined region forward of said propagating boundary surface. Preferably, the predefined gate region may be selectively adjustable.

This provides the advantage that by using optimization functions, such as cost functions, to propagate the boundary surface of the computer model of the tracked reflective surface (horizon), the boundary surface can evolve naturally in very small steps depending on a predefined acceptance criteria allowing the natural contour of the reflective surface to be tracked very accurately. In addition, any barriers (i.e. faults, discontinuities etc.) can be "crossed" utilizing, for example, attractors that are provided by the cost function for each one of the candidate events. For example, candidate events of the tracked reflective surface may be determined on either side of such a barrier. The resulting cost values for each one of the candidate events can then be used to generate an attractive force towards the propagating boundary surface, allowing the boundary surface of the generated computer model to move across any barrier within the gate region and continue tracking the natural contour of the reflective surface without any intervention from the operator.

According to a fourth aspect of the present invention, there is provided a method for adaptively determining one or more horizons from 3D seismic data, comprising the steps of:

generating at least one attribute volume comprising a plurality of attributes from said geological survey data;

identifying at least one region of interest on a predetermined cross-section of said at least one attribute volume;

adding at least one seed to said at least one region of interest;

defining at least one representative area in accordance with said region of interest;

generating a geological object applying a computer executable algorithm according to the first aspect of the present invention and/or the second aspect of the present invention and/or the third aspect of the present invention;

monitoring a visual representation of said geological object during generation; selectively stopping said generation of said geological object;

generating an optimized geological object through manipulation of at least part of said geological object.

The new workflow of the present invention provides several advantages. In particular, being able to apply any combination of or all of the computer executable algorithms of the first, second and third aspects of the present invention provides an extremely high adaptability to varying data quality, quantity and/or varying boundary conditions, allowing the tracking of a natural contour of a reflective surface at maximum accuracy and most effectively. In addition, the capability of having an attribute volume comprising more than one attribute can further improve the detectability/identifyability of a geological object (e.g. a horizon or fault) due to an optimized view of stratigraphic features. In addition, manual and/or automated manipulation of the geological object while it is generated and/or adapted (i.e. real-time visual inspection and feedback of the "growing" feature) by the system, allows for much faster interpretation and optimization of the feature of interest when compared to conventional techniques.

Furthermore, by defining at least one representative area in addition to a seed placed in the region of interest further improves the quality of input information provided to the system, making the method more robust to any changes of the characteristics of the feature of interest and therefore allowing a wider variety of geological features, to be tracked. For example, the operator, such as an experienced interpreter, may select a reflective surface (horizon) and draw a seed along at least part of the feature's length so that it can be adapted (i.e. "grown") into a computer model surface representation of the horizon within the attribute volume. The operator may further select additional areas of the reflective surface of interest providing the system with further qualitative input when adapting the seed. Also, the method allows inputting qualitative information to the system from representative areas of one or more separate, but corresponding horizon features.

Advantageously, the attribute volume may be generated from seismic attributes determined from said 3D seismic data. Preferably, the region of interest may comprise of at least one horizon. Typically, the at least one representative area may be an area that is part of said at least one horizon or an area that may not be part of said at least one horizon. Alternatively, at least one first representative area may be an area that is part of said at least one horizon and at least one second representative area may be an area that may not be part of said at least one horizon.

Steps (c) to (e) of the method of the fourth aspect of the present invention may be repeated until an acceptance criteria is satisfied. Advantageously, the generation of said at least one optimized geological object in step (h) of the method of the fourth aspect of the present invention may be achieved through manual manipulation and/or through automatic manipulation in accordance with said at least one predetermined constraint. Preferably, steps (f) to (h) of the method of the fourth aspect of the present invention may be repeated after adding at least one additional seed and/or defining at least one additional representative area and/or manually manipulating the geological object. Even more preferably, the manual manipulation may include any one of point-by-point editing, surface stretching, segment joining and segment splitting.

This provides the advantage that further qualitative information can selectively be input to the system further improving the adaption/generation of the reflective surface of interest allowing the operator to guide the system along the natural contour of the reflective surface.

Advantageously, the seed and/or representative area may be defined by any one of a point, a line defined by a plurality of points, a polygon defined by a plurality of points, an image mask selected from said attribute volume and an area or region painted in said region of interest. The at least one attribute volume may be a plurality of attribute volumes, each determined from predetermined characteristic attributes of said geological data.

Advantageously, the at least one dataset of said at least one optimized geological object may be exportable for further processing.

According to a fifth aspect of the present invention, there is provided a computer system for adaptively determining one or more horizons from geological data obtained by a method according to the method of the fourth aspect of the present invention, comprising a computer readable memory for storing data, an output device, a computer processor and an input device, such as a man-machine interface adapted to enable an operator to operate the system.

According to a sixth aspect of the present invention, there is provided a computer-readable storage medium having embodied thereon a computer program, when executed by a computer processor, that is configured to perform the method of any one of the first aspect of the present invention and/or the second aspect of the present invention and/or the third aspect of the present invention and/or the fourth aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

Figure 14:
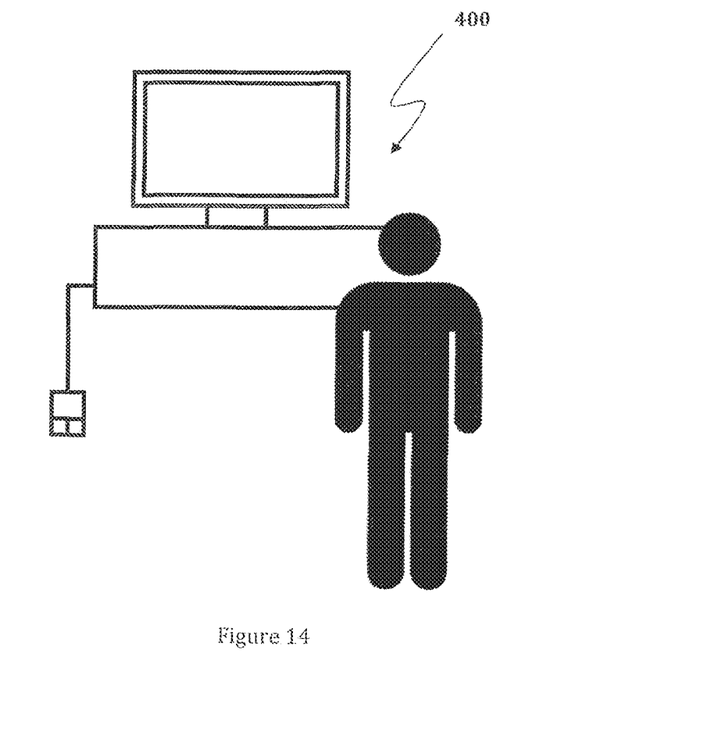
FIG. 14 shows a simple example of a workstation suitable for use with the present invention.

For the purposes of explanation, it should be appreciated that the terms 'determine', 'calculate' and 'compute', and variations thereof, as used herein are used interchangeably and include any type of methodology, process, mathematical operation or technique, including those performed by a computer system 400, as depicted in a simplified form in FIG. 14. The terms 'generating', 'evolving' and 'adapting' are also used interchangeably describing any type of computer modelling technique for visual representation of a subterranean environment from geological survey data, such as 3D seismic data. The terms 'tracking' and 'following' are used interchangeably with the same meaning. A 'natural contour' of a horizon is understood to be the true outline of the reflective surface of the same subterranean layer that is tracked. For example, movement between the Earth's tectonic plates may vertically offset parts of the same subterranean layer (i.e. having the same acoustic, optical or electromagnetic properties) creating a fault. The 'natural contour' of the same subterranean layer includes the step-up/step-down (vertical) caused by a fault. The term 'vertical' is understood to mean vertical within a 3D seismic volume aligned in accordance with the natural position of the strata surveyed, i.e. the stratigraphic layers are substantially horizontal within that volume and a vertical direction within that volume indicates a direction towards a position within that volume that is either above or below a referenced stratigraphic layer.

Propagating Algorithm of the First Embodiment

Figure 6:
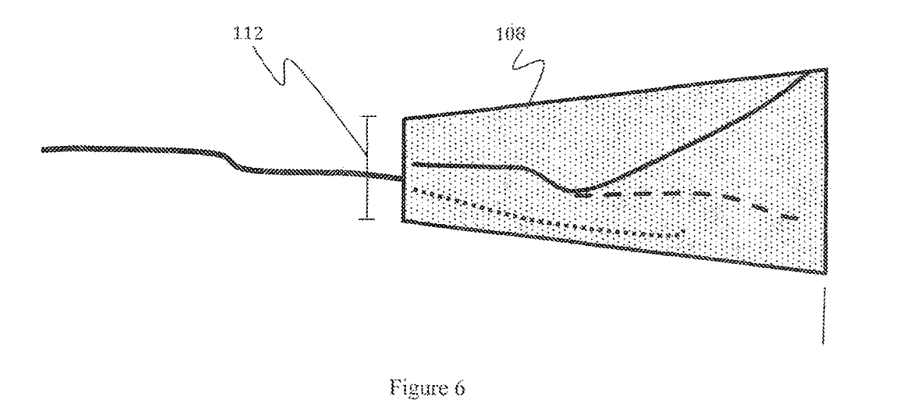
FIG. 6 is an illustration of a gate region forward of its propagating boundary surface.
Figure 7:
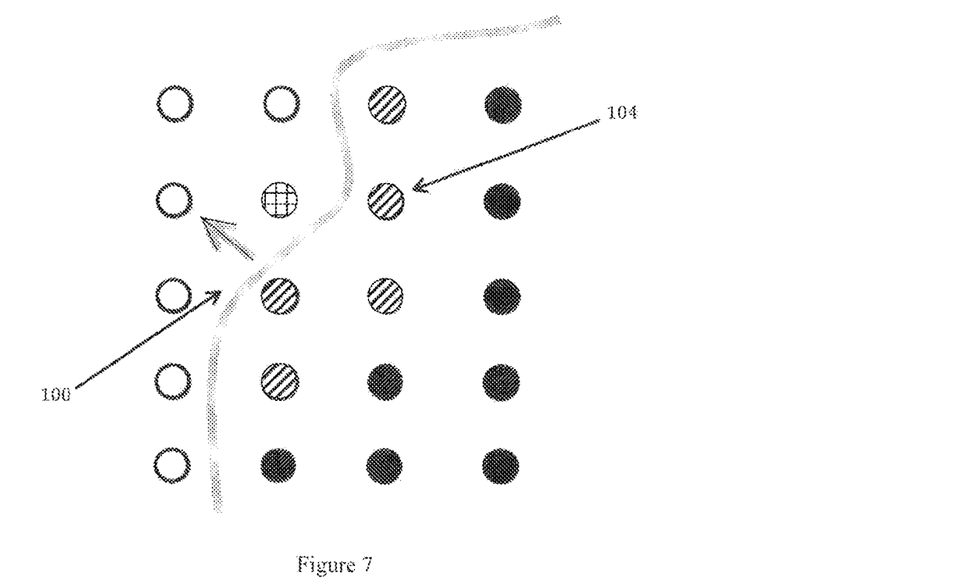
FIG. 7 shows an illustration of a candidate event about to be selected by the advancing boundary surface.

Referring now to FIGS. 5 to 7, a first embodiment of an algorithm executable for providing a method for propagating a front (boundary surface) 100 of at least one seed that is placed within a region of interest along the natural contour of a horizon is illustrated. In this particular example, the boundary surfaces 100, 102 of two seeds are close to merging in order to create a computer model of the natural contour of a reflective surface (i.e. horizon). Grid points 104 coinciding with the tracked surface are shown as black filled circles. Black arrows 106 on the boundary surface 100 represent the propagating direction of the evolving surface 100.

In particular, the algorithm of the first embodiment utilises both local waveform and attribute data characteristics to generate a statistical model for candidate events in a predefined gated region 108. The predefined gated region 108 is selectively adjustable by the operator in order to adapt the algorithm to the individual requirements of different regions of interest. During operation, at least one attribute characteristic, as well as at least one local waveform characteristic is determined for the candidate events enclosed by the predefined gated region 108. The algorithm then applies a probability function based on the determined attribute characteristics and respective local waveform characteristics in order to determine, whether or not, a candidate event meets an acceptance criteria and can be selected to be part of the tracked horizon. If, however, a combined probability from both the attribute characteristic and waveform characteristic of a candidate event do not exceed an acceptance criteria, the algorithm can "move" vertically (i.e. select and analyse data above or below the horizontal plane of the initially tracked horizon) to a location having the next highest probability, therefore allowing the algorithm to "jump" vertically and continue following the natural contour of the same horizon. An example of such a selection process is shown in FIG. 7. The predefined gated region is then moved forward with the next computational step and attribute characteristics and waveform characteristics are determined for the "new" set of candidate events within the "new" predefined gated region. Alternatively, attribute characteristics may be determined in advance for the entire data set of the 3D seismic volume creating at least one attribute data volume that is stored in a temporary storage for further processing. The attribute characteristics for the candidate events are provided from the storage and used for selecting candidate events in accordance with the acceptance criteria.

Suitable probability functions may be the Bayes Rule based classifiers, MAPI based functions or any Fuzzy membership based functions, but any other statistical classifier adapted to select a candidate event in accordance with an acceptance criteria my be used.

The boundary surface 100 may be propagated across the candidate events using an active contour method and/or a level set method or any specific combination of the active contour method and the level set method according to individual requirements of the data set. In particular, when evolving the boundary surface, a marching squares algorithm, or any suitable equivalent algorithm, may be used to generate a new 2D boundary surface 100 after each evolution step (i.e. computational step).

Suitable seismic attributes may be any one of coherency, similarity, variance, semblance, amplitude, curvature, azimuth and dip, but other attributes drivable from the 3D seismic data may be used to highlight the different horizons within the 3D seismic volume.

Figure 8:
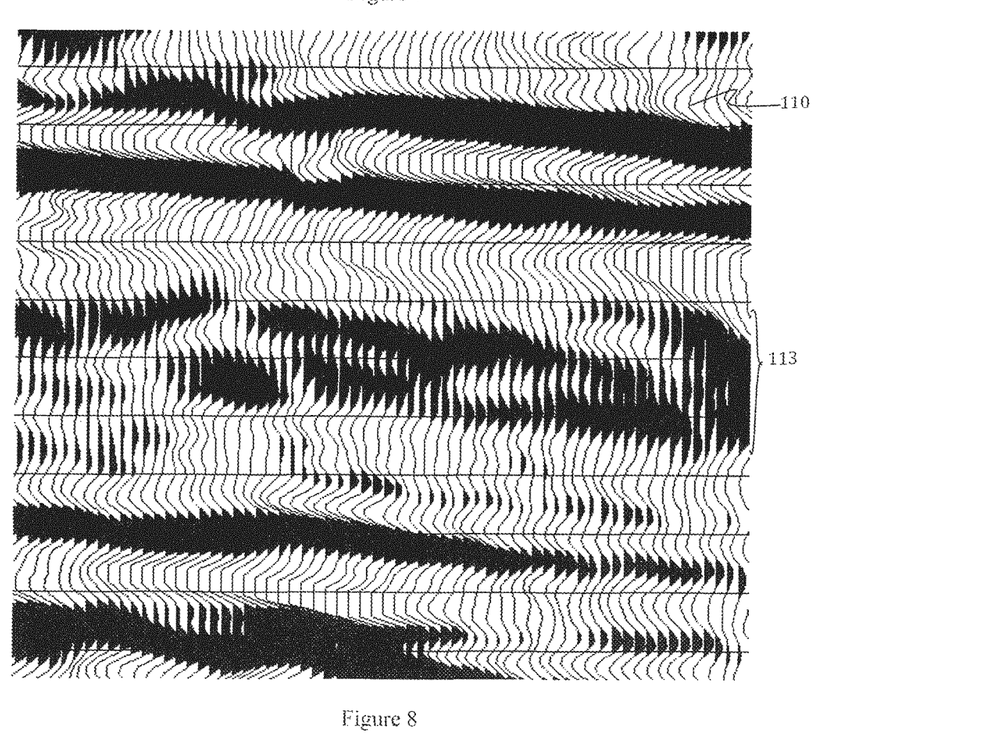
FIG. 8 shows a close-up of a section of seismic data in order to show the shape and variations between the individual waveforms.

A candidate event may be defined by a local signal such as a seismic waveform 110 (see FIG. 8). Locally, seismic waveforms 110 can also be interpreted as a reflector of one of more reflections from well defined interfaces in the Earth, as a response to layering in the Earth and as interference effects due to the imaging process itself. A waveform characteristic, also known as waveform classification, may be a signature found in that seismic trace. This is typically done by working with seismic trace "segments" determined by the vertical dimension 112 (see FIG. 6) of the predefined gate region 108. For example, FIG. 8 shows typical seismic traces 110, wherein a section 113 displays significant variation in waveform shape (i.e. peaks, troughs, zero-crossings).

A waveform characteristic or signature based on, for example, similarities or semblance allows discrimination between these individual waveforms. Waveform characterisation may be a simple cross correlation, where the zero-lag cross correlation of a candidate event (i.e. trace segment or a waveform) is computed with regards to each of the reference segments. Optionally, the cross correlation may be provided for a plurality of zero-lags in order to provide a correlation function with regards to the position on a seismic trace. Alternatively, features of the waveform(s) may be extracted using a fixed basis set. For example, a polynomial sequence may be selected as a basis set that provides some desirable properties, such as orthogonality, invariance to a time-shift, or dilation. Particular examples of such polynomials may be Chebyshev polynomials, Legendre polynomials an any other suitable orthogonal polynomials. The extent of the polynomial sequence determines the basis function for analysing the waveforms, where each reference trace segment is first projected onto each polynomial basis set in order to generate a reference feature vector. The candidate trace segment (i.e. the candidate event) is then projected onto the polynomial basis set, generating a candidate feature vector. A waveform similarity measure can then be computed from the candidate feature vector and each of the reference vectors.

Propagating Algorithm of the Second Embodiment (Using Guide Horizon)

Figure 9:
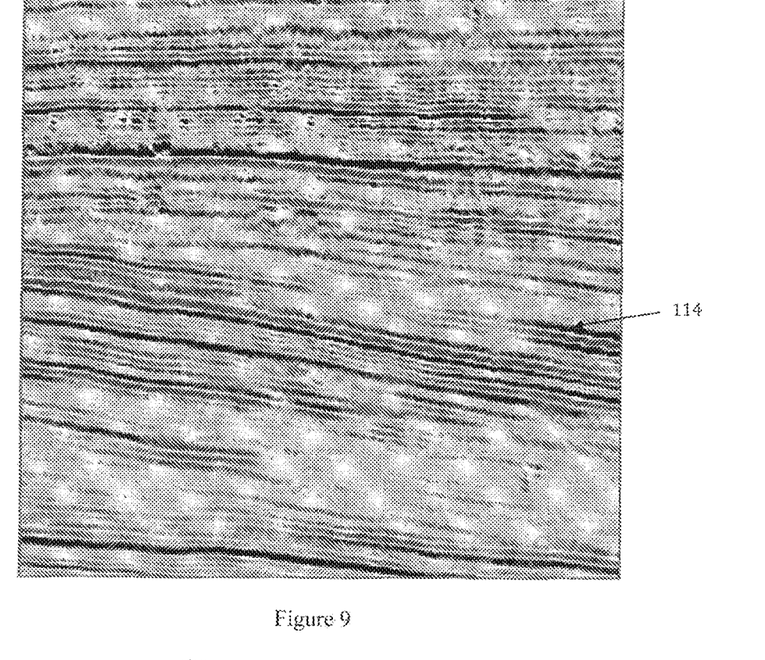
FIG. 9 shows a typical 2D slice of a 3D seismic data volume including a "weak" event region (i.e. data discontinuities)

A second embodiment of the present invention includes an algorithm that allows a propagating boundary surface to "steer" through "poor" data regions of the 3D seismic volume. This algorithm may be used in a horizon tracker system in combination with the algorithm of the first embodiment or as a stand-alone algorithm. "Poor" data regions may include "weak" events 114, which may be defined as event regions whose combined probability is lower than the acceptance criteria, that can not be interpreted by the algorithm or horizon tracker system, and therefore create a barrier to the propagating boundary surface 100. An example of "weak" events 114 is shown in FIG. 9.

Figure 10:
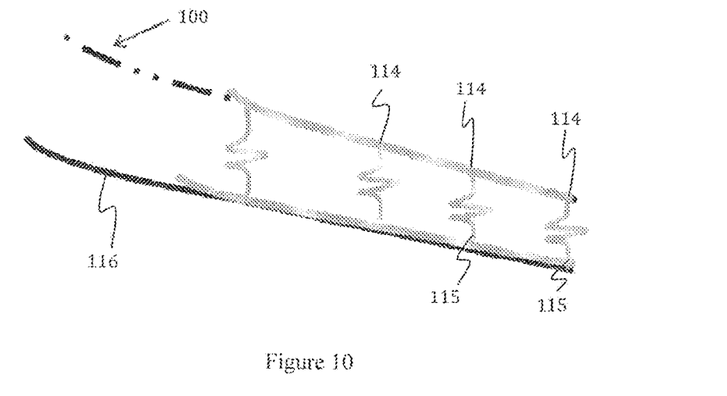
FIG. 10 shows an illustration of the link between the "weak" reflective surface of the tracked horizon and a guide surface using spring forces between respective events.
Figure 11:
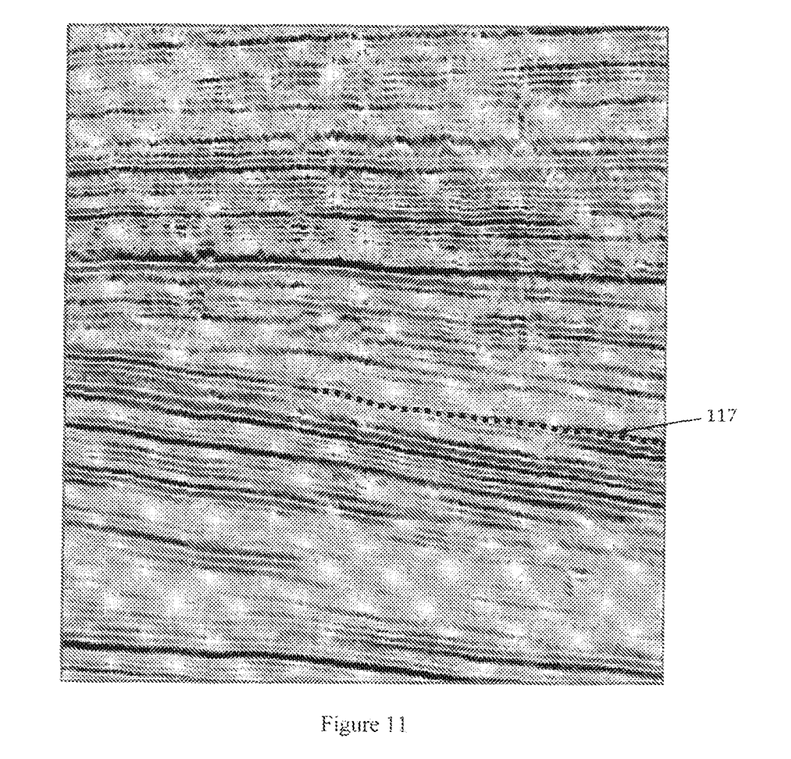
FIG. 11 shows a most likely contour of the tracked horizon through the "weak" event region of FIG. 9.

In order to allow the propagating boundary surface 100 to cross such "weak" events 114 and continue evolving the boundary surface 100 and track the same horizon, a guide reflector surface 116, such as a conformant adjacent horizon, may be used to link 115 the "weak" events 114 to respective events of the guide reflector surface 116 (see FIG. 10). The link 115 may be a constraint, such as a spring force and/or damper, that may be implemented as an internal force in order to limit the vertical movement of the propagating boundary surface 100 at each one of the "weak" events 114. The rigidity of the spring and/or damper may be inversely proportional to the combined probability characteristic (attribute characteristic, waveform characteristic) of the "weak" candidate events 114. For example, candidate events with a lower probability characteristic are linked to the guide reflector surface 116 using a stiffer spring and/or damper, so as to provide less vertical freedom. An example of a tracked horizon 117 (dotted line) using a guide reflector surface 116 is shown in FIG. 11. Optionally, the link 115 may include a weighing factor that is selectively adjustable, so that the operator can control the course of the propagating boundary surface 100 to a limited extent.

Propagating Algorithm of the Third Embodiment (Optimization Function)

Figure 12:
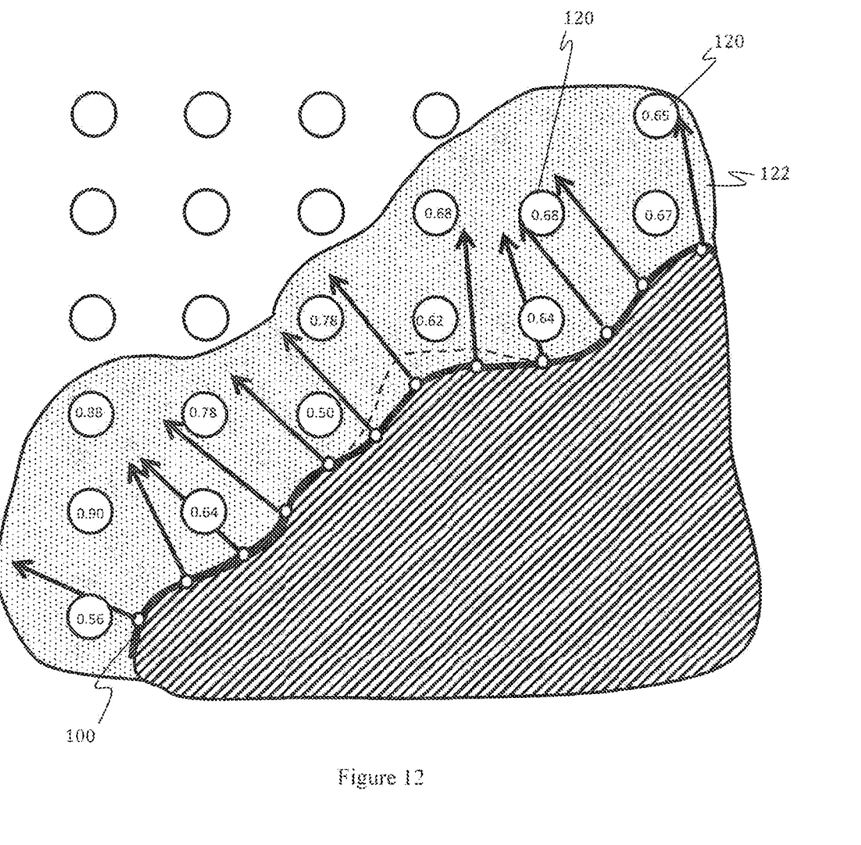
FIG. 12 shows an illustration of cost values provided for each one of the candidate events in the gate region and vectors representing attractive forces generated from the cost values and acting on the boundary surface.

A third embodiment of the present invention is illustrated in FIG. 12 and includes an algorithm that allows the propagation of a boundary surface 100 (e.g. one or more seeds) in accordance with a probability characteristic determined for candidate events 120 within a predefined gated region 122. This algorithm may be used in a horizon tracker system in combination with the algorithm of the first and/or second embodiment or as a stand-alone algorithm.

In particular, the algorithm determines a probability characteristic for each one of the candidate events 120 and generates an optimization function that is used to create a force for each one of the candidate events adapted to attract the boundary surface 100 according to a value of the probability characteristic. Preferably, the optimization function is a cost function field created with each processing step moving the boundary surface 100 towards and past candidate events 120 that fulfil an acceptance criteria, resulting in a computer representation of the tracked horizon. As a result, any barrier (e.g. fault) to the propagating boundary surface 100 may be crossed if the combined force generated for candidate events 120 located across the barrier is sufficient to pull the boundary 100 surface past the barrier. The forces generated for the candidate events within the predefined gated region also allows the boundary surface 100 to propagate across the candidate events 120 in intervals considerably smaller that the distance between individual candidate events 120.

Workflow Method

Figure 13:
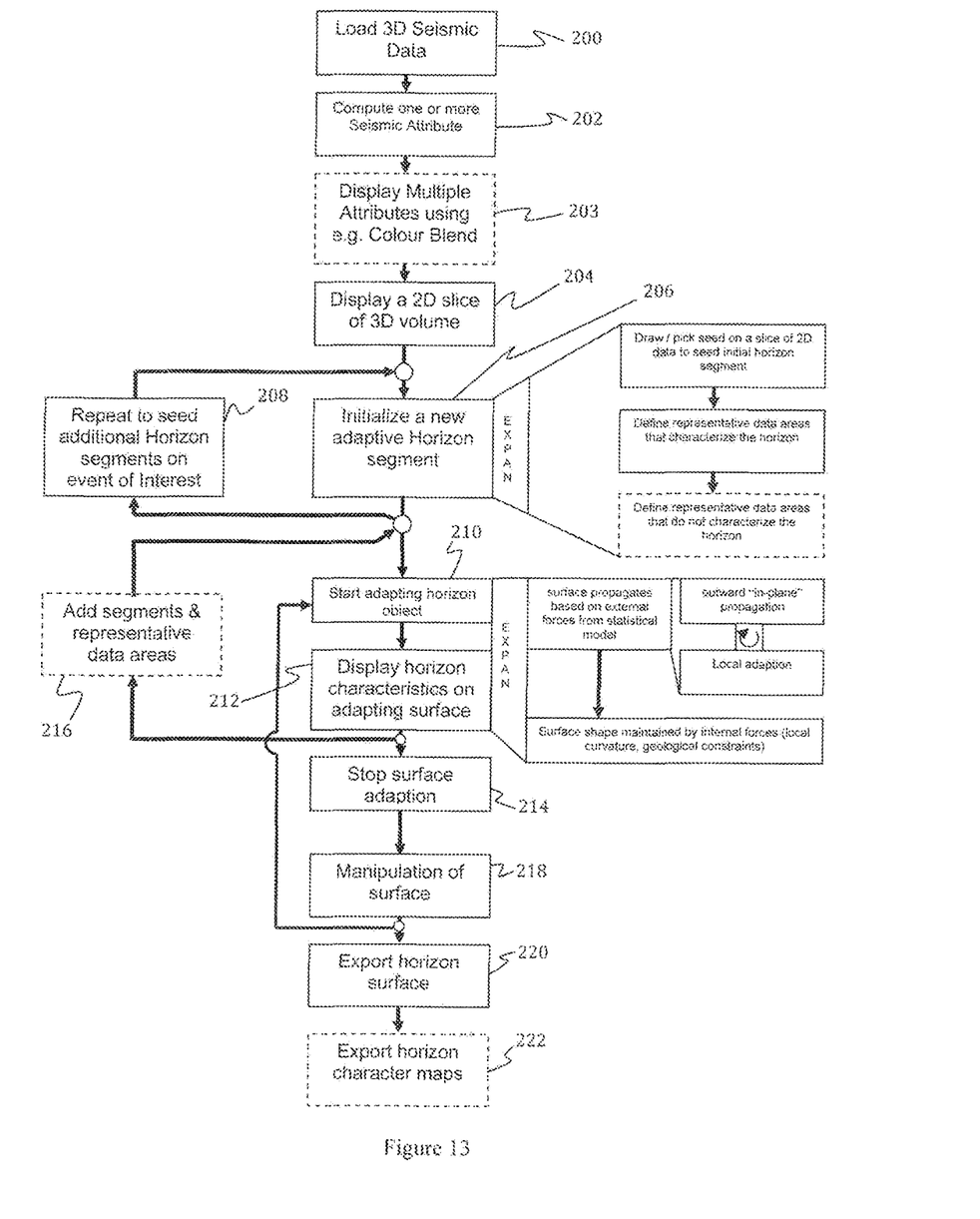
FIG. 13 shows a flow diagram of a workflow of the present invention.

Referring now to FIG. 13, a flow diagram of the workflow method of the present invention is shown. The novel workflow approach is based on presenting seismic data to an operator, such as an experienced interpreter or a trained geophysicist, and a computer system is processing the data and additional input from the operator in a manner that optimizes the visualization of the subterranean strata and the modelled geological features (e.g. horizon).

In this exemplary embodiment illustrated in FIGS. 13, 3D seismic data is loaded into the system for processing 200. Random noise, coherent noise or any other artefacts may be removed or at least reduced from the 3D seismic data by applying a suitable noise filter and/or spatial filter.

At least one attribute is then calculated 202 in order to synthesize an appropriate image to further improve the detectability/identifyability of specific geological features (e.g. horizons) therefore making the extraction of the feature of interest possible. The attribute data may be visualized as a 2D slice from the 3D attribute volume 204. Suitable attributes of the 3D seismic data may be any one of coherency, similarity, variance, semblance, amplitude and structural attributes, such as curvature, azimuth and dip (as is known in the art), but any other attribute derivable from the geophysical data may be used to make the horizons more visible.

Optionally, a plurality of attributes may be combined and displayed using a colour blend 203 for the juxtaposed attribute values, thus, providing an improved confidence level for the shape/profile and location/orientation of the horizon.

Once the attribute volume has been generated, the operator (interpreter, trained geophysicist) initializes a new adaptive segment 206 by "planting" a seed in a region of interest (e.g. a horizon feature) and starting the adaption/generation process of the horizon from the seed. In particular, a seed is "planted" by simply drawing or picking a seed in the region of interest. A seed may be a point, a line defined by a plurality of points, a polygon defined by a plurality of points, an area painted within the region of interest or an image mask selected within the attribute volume.

One or more representative areas having the same or at least similar characteristics as the region of interest may also be defined by the operator at this stage. In particular, it is possible to provide the system with additional input for generating and adapting a horizon from other horizon regions that do not appear to be part of the region of interest, but which are easier to identify and select from the attribute volume.

Optionally, one or more excluded representative areas may be defined by the operator in order to provide further input to the system helping to "guide" the adaption of the horizon along a "true" natural contour within the attribute volume.

Additional seeds can be planted 208 within the region of interest during this stage, wherein the initialization of the adaptive segment is repeated each time a new seed is planted until the operator is satisfied with the initial shape and orientation of the horizon.

When generating and adapting 210 the horizon of interest, a basic geological object having a probability characteristic for each candidate event so that the subsequent cost function field may provide external forces that encourages propagation in a data driven manner along the natural contour of the horizon of interest and as sampled by each seed. Additionally, excluded representative areas are also used in order to limit its deformation into such regions. In particular, the open surface mesh propagation is based on internal forces providing boundary conditions that limit the open surface mesh to geological meaningful shapes, i.e. as defined/constrained by surface topological measurements, therefore preventing the horizon to evolve/adapt into pathological cases. Preferably, the open surface mesh is limited to outward "in-plane" (i.e. planar) propagation, but this limitation is not understood as an exclusion of any other suitable techniques for mesh propagation. During this process, the operator can selectively alter the deformation parameters (e.g. external forces, internal forces) and the horizon will adapt to the new parameters and interactively alter the deformation/adaption accordingly. In particular, the effect of the internal forces on the deformation process may be varied by changing an "importance" or "weighting" factor attached to the defined internal forces.

Optionally, further seeds and/or representative areas may be added 216 at this stage, wherein the horizon adaption is re-started after each new additional input.

The method of the present invention allows the operator to monitor the evolving horizon and its boundary surface characteristics in real time, and to selectively stop 214 the adaption process manually. Alternatively and/or additionally, the adaption process of the horizon may be stopped 214 automatically by the system in accordance with boundary conditions defined by the operator.

Once the initial horizon adaption is completed, the operator may manipulate 218 at least part of the horizon and its boundary surface in order to optimize the computer model so that it complies with expert knowledge of an experienced interpreter. Suitable manual manipulation of the horizon performed by the operator may include any or all of point-by-point editing, surface stretching, surface segment joining, surface segment splitting, surface smoothing and/or surface erasing.

The final optimized representation of the horizon can then be exported 220 (e.g. as a pointset) including any characterizing information 222 derivable from the modelled horizon and/or seismic attribute data for further use.

It will be appreciated by persons skilled in the art that the above embodiments have been described by way of example only and not in any limitative sense, and that various alterations and modifications are possible without departing from the scope of the invention as defined by the appended claims.

The invention claimed is:

1. A system for improving oil and gas exploration by adaptively generating a computer model surface along the natural contour of a horizon and across a barrier in 3D seismic data comprising:
   a computer including a computer processor and computer readable memory;
   wherein said computer readable memory stores 3D seismic data taken from a geological region in the exploration of oil and gas;
   a display that shows an operator a visual representation of said 3D seismic data including a plurality of horizons of said 3D seismic data including the barrier in said 3D seismic data, wherein each of said horizons includes a substantially horizontal stratigraphic layer of differentiable seismic characteristics;
   an algorithm which propagates a boundary surface of a seed that is placed within a first region of interest of said visual representation of said 3D seismic data so as to follow a natural contour of the horizon;
   an input device wherein an operator inputs, by viewing said visual representation of said 3D seismic data, the seed and a predefined gate region located forward of said propagating boundary surface;
   wherein said algorithm is executed on said computer processor to:
   (i) generate at least one characteristic parameter for a plurality of candidate events of said 3D seismic data within said predefined gate region located forward of said propagating boundary surface, wherein said plurality of events include seismic waveforms;
   (ii) generate and assign a probability characteristic for each one of said plurality of candidate events based on said at least one characteristic parameter, wherein the barrier comprises a region including candidate events of said plurality of candidate events for which the corresponding probability characteristic is lower than an acceptance criteria for inclusion in the boundary surface;
   (iii) determine a plurality of events of at least part of at least a second region of interest as a guide reflector located substantially parallel to and conformant with at least part of said first region of interest; and
   (iv) propagate said boundary surface across said barrier in said 3D seismic data utilizing at least one constraint linking each of the candidate events in the region of the barrier to corresponding events of said guide reflector wherein said guide reflector is an adjacent horizon and the at least one constraint is an internal force limiting vertical movement across said barrier;
   responsive to said step (iv) transmitting instructions to said computer that generate, without any intervention from the operator, a computer model surface for viewing on said display along the natural contour of said horizon and across said barrier in the 3D seismic data, which enables locating reservoirs of oil and gas.

2. A system according to claim 1, further executable to generate at least one attribute volume comprising at least one attribute derivable from said 3D seismic data.

3. A system according to claim 1, wherein said at least one constraint is defined in accordance with said probability characteristics assigned to each one of said plurality of candidate events of at least part of said first region of interest.

4. A system according to claim 1, wherein said internal force between respective events is inversely proportional to said probability characteristics of each one of said plurality of events of at least part of said first region of interest.

5. A system according to claim 3, wherein said constraint includes a selectively adjustable weighing factor.

6. A system for improving oil and gas exploration by adaptively generating a computer model surface along the natural contour of a horizon and across a barrier in 3D seismic data comprising:
   a computer including a computer processor and computer readable memory;
   wherein said computer readable memory stores 3D seismic data taken from a geological region in the exploration of oil and gas;
   a display that shows an operator a visual representation of said 3D seismic data including a plurality of horizons of said 3D seismic data including the barrier in said 3D seismic data, wherein each of said horizons includes a substantially horizontal stratigraphic layer of differentiable seismic characteristics;
   an algorithm which propagates a boundary surface of a seed that is placed within a first region of interest of said visual representation of said 3D seismic data so as to follow a natural contour of the horizon;
   an input device wherein an operator inputs, by viewing said visual representation of said 3D seismic data, the seed and a predefined gate region located forward of said propagating boundary surface;
   wherein said algorithm is executed on said computer processor to:
      (i) generate at least one characteristic parameter for a plurality of candidate events of said 3D seismic data within said predefined gate region located forward of said propagating boundary surface, wherein said plurality of events include seismic waveforms;
      (ii) generate at least one attribute volume comprising at least one attribute derivable from said 3D seismic data;
      (iii) generate and assign a probability characteristic for each one of said plurality of candidate events based on said at least one characteristic parameter, wherein the barrier comprises a region including candidate events of said plurality of candidate events for which the corresponding probability characteristic is lower than an acceptance criteria for inclusion in the boundary surface;
      (iv) determine a plurality of events of at least part of at least a second region of interest as a guide reflector located substantially parallel to and conformant with at least part of said first region of interest; and
      (v) propagate said boundary surface across said barrier in said 3D seismic data utilizing at least one constraint linking each of the candidate events in the region of the barrier to corresponding events of said guide reflector wherein said guide reflector is an adjacent horizon and the at least one constraint is an internal force limiting vertical movement across said barrier;
   responsive to said step (v) transmitting instructions to said computer that generate, without any intervention from the operator, a computer model surface for viewing on said display along the natural contour of said horizon and across said barrier in the 3D seismic data, which enables locating reservoirs of oil and gas.

* * * * *